(12) United States Patent
Kim

(10) Patent No.: US 10,931,770 B2
(45) Date of Patent: Feb. 23, 2021

(54) SYSTEM FOR NOTIFYING OF ARRIVAL AT SUBWAY STATION AND PROVIDING STATION INFORMATION BY USING INTEGRATED SMARTPHONE POSITIONING

(71) Applicant: Kyoung Sik Kim, Chatswood (AU)

(72) Inventor: Kyoung Sik Kim, Chatswood (AU)

( * ) Notice: Subject to any disclaimer, the term of this patent is extended or adjusted under 35 U.S.C. 154(b) by 106 days.

(21) Appl. No.: 15/991,076

(22) Filed: May 29, 2018

(65) Prior Publication Data

US 2019/0356749 A1    Nov. 21, 2019

(30) Foreign Application Priority Data

May 17, 2018    (KR) .......................... 10-2018-0056819

(51) Int. Cl.

| | |
|---|---|
| *G06F 15/16* | (2006.01) |
| *H04L 29/08* | (2006.01) |
| *G01C 21/00* | (2006.01) |
| *H04W 4/029* | (2018.01) |
| *G06Q 50/30* | (2012.01) |
| *H04W 4/02* | (2018.01) |

(52) U.S. Cl.
CPC ............ *H04L 67/26* (2013.01); *G01C 21/005* (2013.01); *G06Q 50/30* (2013.01); *H04W 4/027* (2013.01); *H04W 4/029* (2018.02)

(58) Field of Classification Search
CPC ..... H04W 4/026; H04W 4/027; H04W 4/029; H04W 4/42; H04L 67/26; G01C 21/005; G06Q 50/30
See application file for complete search history.

(56) References Cited

U.S. PATENT DOCUMENTS

| | | |
|---|---|---|
| 2005/0289611 A1 | 12/2005 | Taki |
| 2007/0150129 A1 | 6/2007 | Davenport et al. |
| 2010/0227560 A1 | 9/2010 | Wu et al. |
| | (Continued) | |

FOREIGN PATENT DOCUMENTS

| | | |
|---|---|---|
| KR | 10-0629452 B1 | 9/2006 |
| KR | 20-0479641 Y1 | 2/2016 |

OTHER PUBLICATIONS

Colin Lalley, Survive the New York City subway with these 6 apps, Jun. 29, 2017 (Year: 2017).*

*Primary Examiner* — Oleg Survillo
(74) *Attorney, Agent, or Firm* — Park & Associates IP Law, P.C.

(57) ABSTRACT

A system for notifying of arrival at a subway station and providing station information by using integrated smartphone positioning includes: a providing system 11 connected to a user terminal 12 through a network; and the user terminal including a current location identifying module 21, a path generating module 22, a boarding identifying module 23, an advertisement providing module 24, a stop station guidance module 25, and a sensor unit 27 having a plurality of sensors. The providing system 11 includes a sensing pattern information DB 31 storing information repeatedly sensed by the plurality of sensors at a predetermined location. The current location identifying module 21 determines the current location of the user terminal 12. The stop station guidance module 25 provides, to the user terminal 12, information about a nonstop station and about arrival at an arrival station on a real-time basis.

10 Claims, 12 Drawing Sheets

(56) References Cited

U.S. PATENT DOCUMENTS

2013/0063301 A1    3/2013  Pattabiraman et al.
2016/0362123 A1*  12/2016  Schultz .................. B61L 3/008
2019/0147743 A1*   5/2019  Kamini ............ G08G 1/096822
                                                                       348/118

* cited by examiner

Advertisement and message based on spot

| station | location | AP | BLE | geo magnetic | barometer | Acceleration | gyro | Message | Advertisement |
|---|---|---|---|---|---|---|---|---|---|
| Cityhall STN | Entrance 1 | * | * | * | * | * | * | This is Cityhall Stn. Do you need WATA messaging service? | |
| | Entrance 2 | * | * | * | * | * | * | This is Cityhall Stn. Do you need WATA messaging service? | |
| | Entrance 3 | * | * | * | * | * | * | This is Cityhall Stn. Do you need WATA messaging service? | |
| | Entrance 4 | * | * | * | * | * | * | This is Cityhall Stn. Do you need WATA messaging service? | |
| | Entrance 5 | * | * | * | * | * | * | This is Cityhall Stn. Do you need WATA messaging service? | |
| | Entrance 6 | * | * | * | * | * | * | This is Cityhall Stn. Do you need WATA messaging service? | |
| | Up platform | | | * | * | * | * | This is Cityhall Stn. The door is right | [advertisement image] |
| | Down platform | | | * | * | * | * | This is Cityhall Stn. The door is right | |

FIG. 11

SYSTEM FOR NOTIFYING OF ARRIVAL AT SUBWAY STATION AND PROVIDING STATION INFORMATION BY USING INTEGRATED SMARTPHONE POSITIONING

REFERENCE TO RELATED APPLICATIONS

This application claims the priority benefit of Korean Patent Application No. 10-2018-0056819, filed on May 17, 2018, the entire contents of which are incorporated herein by reference.

FIELD OF THE INVENTION

The present disclosure relates to a system for notifying of arrival at a subway station and providing station information by using integrated smartphone positioning.

BACKGROUND OF THE INVENTION

To notify of arrival at the current subway station, information about the current station and the next station has been provided as voice information in various languages, and an indicator board, displaying the current station, together with a subway line map have been provided above doors within a passenger car.

Meanwhile, as the use of personal mobile terminals increases rapidly, users, using a subway or bus are using various services such as messengers, video watching, games, shopping, and web surfing using their mobile terminals during the use of public transportation, as well as a location-based service such as pathfinding or navigation, but cannot use a service except for a subway line map in a place such as a subway.

Outdoors, the users can easily search for the current location by using their personal mobile terminals and map services, which is because a global positioning system (GPS) is available outdoors. But, it is very difficult to use such a service in an underground space, an in-building space, and a built-up area where a GPS is not available, and therefore, the users should determine the current location by themselves.

For example, it is difficult for a train or subway frequently passing through an underground space or a tunnel to provide information about stops to the users. In this regard, Korean Patent Registration No. 10-0629452 "Method and System for Providing a Relief Public Transportation Service by Using a Mobile Communication Network" discloses a method for identifying whether a user boards a vehicle using the location of a mobile communication terminal and information about the location of the vehicle and notifying the family or acquaintances of such information.

The above invention provides information about where a public transportation vehicle is and what a next station is by using the GPS of the mobile communication terminal. However, when the user is in a vehicle, such as a train or subway, moving through a tunnel or underground space or in an interior such as a station, the GPS becomes useless. A receiving signal is weakened by being blocked by buildings even when the user is outdoor. Positioning is impossible, or the accuracy thereof is reduced due to an increase in the number of multipath errors. Even if the user moves from a space where the GPS does not work to that where the GPS works, it may take a long time for initial positioning to operate the GPS.

However, as the use of personal mobile terminals increases rapidly within public transportation, wired and wireless earphones have been used to reduce noise damage to surrounding passengers. With the development of IT technology, the number of consumers, seeking high-image quality and high-audio quality mobile terminals, is increasing, and the consumers regard their high-performance earphones as important. Among the earphones, some, perfectly blocking the surrounding noise and reproducing, with high audio quality, only audio played by the terminals, have been highlighted.

Using an earphone within a public space or public transportation does not cause noise damage to surrounding individuals. However, if a user is completely blocked from external sound when wearing an earphone, the use may not properly deal with an accident that may occur in public transportation.

For example, even if an announcement for warning passengers of proceeding to the snack bar of the seventh passenger car of KTX is provided and the announcement information is displayed on the monitors within the KTX when any accident occurs at the snack bar while a user is boarding on the eighth passenger car, the user may move to the snack bar because of external sound blocked by his/her earphone and his/her eyes fixed on his/her mobile phone. If the crew did not block the passage in advance, the user, moving to the snack bar in an emergency, may encounter a risk while not knowing anything.

Accidents do not often occur within public transportation. However, in the case of large transportation such as a train or airplane, a method for notifying passengers of an event or accident having occurred is limited to directly telling to the passengers or to an announcement or captions on a monitor for all of the passengers. In the case of a ship such as a cruise ship, as the size of transportation is greater, some of the passengers are highly likely not to watch or hear the announcement of such event or accident. Therefore, the announcement may be useless to a passenger viewing only his or her personal terminal with his or her earphone worn.

In this regard, Korea Utility Model Registration No. 20-0479641 "Sound System for a Vehicle for Preventing an Accident" discloses a method for allowing a vehicle having an electronic control unit to transmit sound having a meaning of caution or warning without providing a feeling of discomfort by using white noise to prevent an accident. However, this invention is limited to some earphones on the market, and it is impossible for the above system to provide more detailed information about the accident or the like by only transmitting the sound to the outside.

SUMMARY OF THE INVENTION

An embodiment of the present disclosure is to provide a system for providing information about a stop station and an arrival station with high accuracy through a smartphone, identifying the location of a smartphone user without global positioning system (GPS) information within a station, providing the identified location to the smartphone user, and providing adequate information to the smartphone user.

Another embodiment of the present disclosure is to provide a system for providing, to a smartphone user, information except for information about an arrival station or the like, and an advertisement while providing the information about an arrival station or the like to the smartphone user through a smartphone, and providing an advertisement suitable for the smartphone user to the smartphone user while the smartphone user moves within a station.

According to an embodiment of the present disclosure, a system for notifying of arrival at a subway station and providing station information by using integrated smartphone positioning includes: a providing system 11 connected to a user terminal 12 through a network; and the user terminal including a current location identifying module 21, a path generating module 22, a boarding identifying module 23, an advertisement providing module 24, a stop station guidance module 25, and a sensor unit 27 having a plurality of sensors, in which the providing system 11 includes a sensing pattern information DB 31 storing information repeatedly sensed by the plurality of sensors at a predetermined location, the current location identifying module 21 compares the information sensed by the sensor unit 27 with sensing information stored in the sensing pattern information DB 31 to determine the current location of the user terminal 12, and the stop station guidance module 25 determines a direction where a user heads according to the location of a platform on which the user boards a subway when the current location is determined, receives, from a subway line map DB 32, information about a next station and about a predicted time of arrival at the next station, and provides, to the user terminal 12, information about a nonstop station and about arrival at an arrival station on a real-time basis.

The plurality of sensors of the sensor unit may include two or more of a Wi-Fi module, a Bluetooth module, a geomagnetic sensor, a barometer, a magnetic sensor, an acceleration sensor, and a gyro sensor.

Spots at which the sensed information is stored in the sensing pattern information DB 31 may include an up platform, a down platform, a ticket barrier, and an entrance of a station.

The interior of the station may be divided into a plurality of zones having a certain size, and the providing system 11 may determine at least one place of boundary lines and centers of the individual zones, may obtain an average value and a standard deviation value by repeatedly measuring the sensing information at the determined at least one place, and may store the obtained average value and standard deviation value in the sensing pattern information DB 31.

The interior of the station may be divided into a plurality of spots, and the providing system 11 may collect sensing pattern information at the respective spots, may store an advertisement designated at each spot in an advertisement DB, and may provide a different advertisement to the user at each spot. The providing system 11 may provide a different advertisement to the user according to a spot suitable for the user.

The sensing pattern information DB 31 may be configured in the form of a neural network which learns data using location values (x, y, w) of the station as output values and using sensed values sensed by the plurality of sensors at a corresponding location as input values, and the providing system 11 may provide a predicted location value as an output value to the user terminal through the neural network having learned the data when receiving a sensed value.

The path generating module 22 may store the information sensed by the user terminal 12 in a moving history storage information DB 33 at regular time intervals and may generate the user's moving path from the stored information. The boarding identifying module 23 may identify that the user boards the subway from the generated user's moving path and currently sensed information such that the stop station guidance module 25 starts to provide guidance on a stop station.

The advertisement providing module 24 may receive, from the advertisement DB storing a preferred location together with the advertisement, an advertisement requested by the user terminal at the preferred location when the user terminal is located at the preferred location and may provide the received advertisement to the user terminal.

BRIEF DESCRIPTION OF THE DRAWINGS

The above and other aspects, features, and advantages of the present disclosure will be more clearly understood from the following detailed description, taken in conjunction with the accompanying drawings, in which:

FIGS. 1 to 12 are drawings illustrating embodiments of the present disclosure.

DETAILED DESCRIPTION OF THE INVENTION

Figure 1:
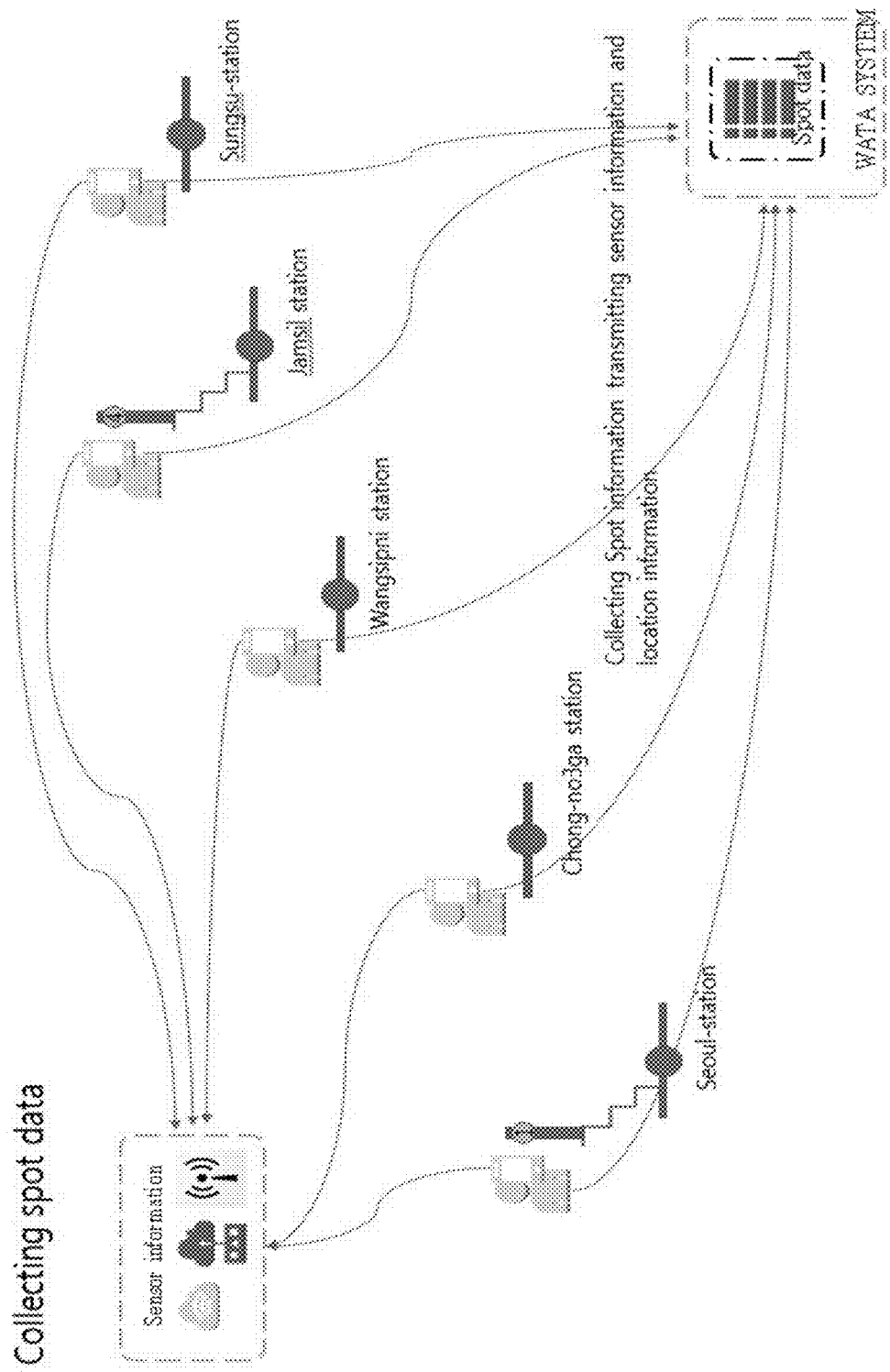

Hereinafter, exemplary embodiments of the present disclosure will be described in detail with reference to the attached drawings. FIG. 1 is a drawing illustrating an embodiment of the present disclosure. In an embodiment, sensors which are or can be embedded in a user terminal other than a global positioning system (GPS) are used to obtain information about the location of the user terminal within a station. The locations of the station are divided into a plurality of zones, and the types of information sensed by the respective sensors in the respective zones are collected to create a database. Since the combinations of the respective sensors are unique values indicating the locations, the current location of the user terminal is identified by comparing values stored in the database with those sensed by the user terminal.

FIG. 1 illustrates an example of collecting data at spots for such an operation. A spot refers to a place where data is collected. In FIG. 1, a Wi-Fi signal, a Bluetooth signal, a geomagnetic signal, a barometer signal, a magnetic field signal, an acceleration signal, and a gyro signal are sensed. Recently sold smartphones include all sensors handling such information and may identify locations thereof from other information even if not sensing some of the above signals. In addition, an additional sensor may be used in the smartphones. The smartphones may further include another sensor which may be embedded therein while sensing a value varying according to locations thereof. Further, even if the same type of signals such as Wi-Fi signals are present in different forms, when the signals can be sensed, the signals may be used together. For example, in a case where two Wi-Fi signals are used, intensity values thereof may be changed according to the locations of the smartphones, and thus the two Wi-Fi signals may be used to identify the locations of the smartphones in a planar zone.

It is not required to know information at all spots at a subway station to identify information about the current station is passing and about a next stop station while the user boards a subway. To identify the above station information, it is sufficient to know only values at spots corresponding to up and down platforms, which are locations where the subway stops. For example, when the user being on the subway desires to turn on a smartphone and identify what the current station is, a current location identifying module 21 collects sensing information stored in the smartphone, compares the collected sensing information with sensing pattern information stored in a sensing pattern information database (DB) 31, and identifies the location of the current station from sensing pattern information most similar to sensed sensing information.

The GPS combines information obtained from a plurality of GPS satellites without directly using the information to identify a more accurate location. Thus, it takes a long time for the GPS to determine an initial location. However, since information sensed in an embodiment of the present disclosure uses an intensity signal in the case of a Wi-Fi signal or a Bluetooth signal, the information may be immediately sensed and used when the subway arrives at a station. The sensing pattern information DB 31 repeatedly measures signals, for example, intensity signals, calculates an average and a standard deviation thereof, and determines whether sensed information is within a certain range of a distribution using the average and the standard deviation, thereby identifying the current location. In addition, a plurality of Wi-Fi signals may be used.

In the case of the same up or down platform, because the up or down platform is long, the up or down platform may be divided into a plurality of spots, and signals may be measured. For example, an area from the location of a first passenger car to a stop location of a last passenger car is divided into a plurality of zones, and then the sensing pattern information DB 31 is created by using signals sensed in the respective zones. As the area is divided into a larger number of zones to create sensing pattern information, a more accurate location may be identified.

Figure 2:
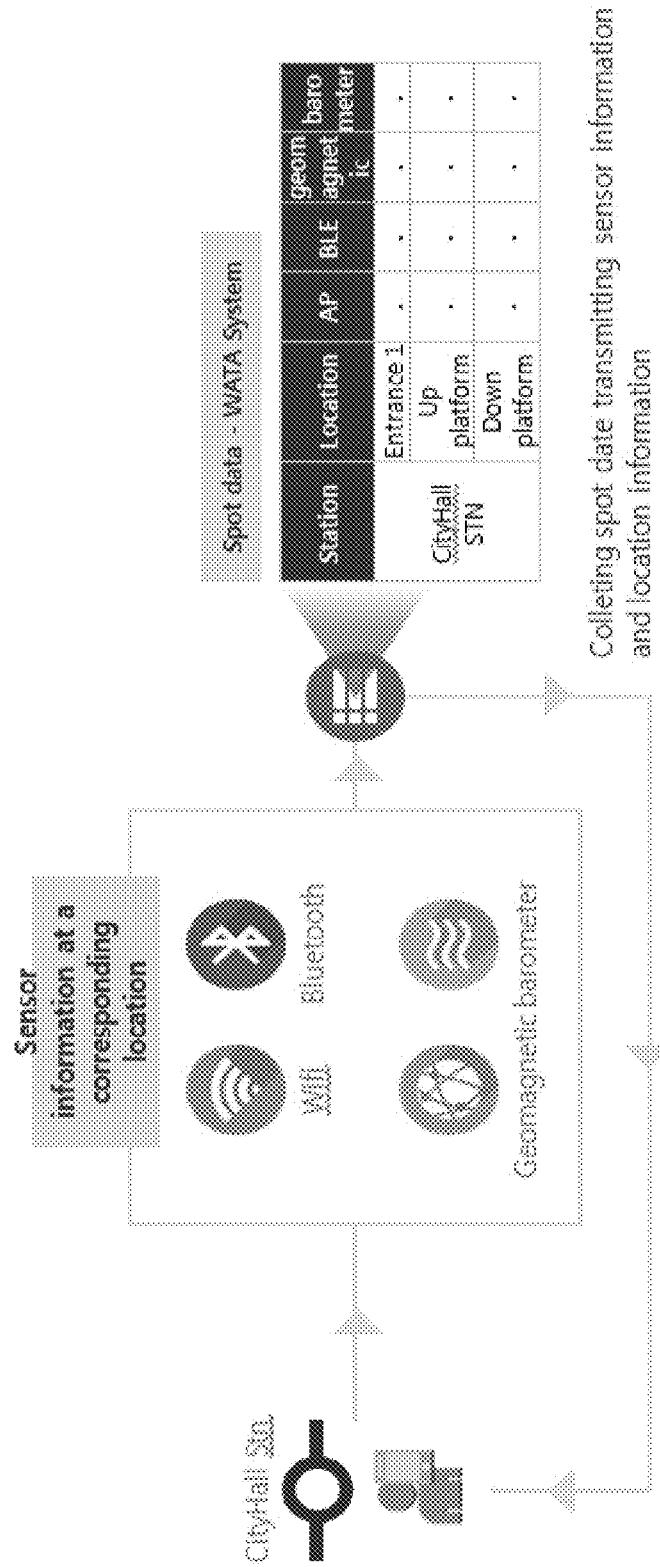

FIG. 2 illustrates an example of collecting sensing pattern information at the spots of respective stations and storing the sensing pattern information by a providing system 11. The providing system 11 collects sensing pattern information at the respective spots of each station to create the sensing pattern information DB 31 and may designate an entrance of a subway station as a spot when creating the sensing pattern information DB 31 to store sensing pattern information. Because sensing pattern information has a different pattern at each station, any spot at any station may be determined by using only collected sensing information, and when a subway travels from a specific station to the next station, it may be identified that the subway arrives at the next station by only detecting that a spot pattern of the next station is sensed. Thus, it may be sufficient to only store sensing pattern information obtained at several spots of a subway station to identify the arrival. Because more spots are used in stations and similar sensing pattern information are sensed in each station, errors may occur. To eliminate the possibility of the errors, information about a corresponding station may be included in a Bluetooth signal or the like to specify the corresponding station. Even when sensing pattern information is not a Bluetooth signal, a corresponding station may be immediately identified by checking an SSID value of an access point (AP) signal. In FIG. 2, sensing information is only collected at several spots such as an entrance, an up platform, and a down platform. When corresponding information is sensed, a corresponding station may be identified, and when the corresponding information is not sensed any longer, it may be determined that the subway departed from a station, and guidance information about the next station may be provided.

Most of the current indoor location-based service patents are based on Wi-Fi signals. In Korea, since iPhone having a market share of greater than 33% is presently restricted not to measure a Wi-Fi intensity signal, it is impossible to apply indoor positioning using only a Wi-Fi signal to iPhone. However, the present application may use only other sensors rather than a Wi-Fi signal, as well as using a plurality of Wi-Fi signals, and thus the indoor positioning may be applied to iPhone which is prevented from measuring some sensing signals.

The following formulae assume that signals are measured by an i number of sensors at an m number of spots.

$$S_{i,j} = \frac{S_{max,j} - S_{measurement,j}}{S_{max,j}}$$

$$S_{av,j} = \left(\sum_{i=1}^{n} \frac{S_u}{n}\right), j = 1, 2, \ldots m,$$

where $S_{measurement,j}$ is an actually measured value at a jth location, and $S_{ij}$ is calculated by normalizing $S_{measurement,j}$ using $S_{max,j}$ having a maximum value at the jth location. $S_{ij}$ is used as a measured value measured by an ith sensor at the jth location, $S_{av,j}$ is an average of measured values measured at a specific location, for example the jth location, m is the number of measurement spots, and n is the number of sensors.

The sensing pattern information DB 31 is created by averaging measured values measured by the respective sensors, the values measured at the respective spots of each station, in the manner described above, and by calculating a standard deviation thereof.

Such measured values may be changed according to devices used and may be varied according to aging of devices even when the devices are of the same type. Because the measured values are changed according to the temperature, humidity, and density of devices rather than mechanical properties thereof, the measured values are repeatedly obtained, but do not reflect device-dependent properties.

To solve this issue, correction factors able to correct the measured values are calculated and applied at an initial execution of correction and after a certain period of time thereafter.

Correction factors a and b may be obtained by the following formula:

$$S_{av,j} = S_u\left(1 - a_j\left(1 - \frac{S_u}{S_{av,j}}\right)^{bi}\right) j = 1, 2, \ldots m,$$

where $S_{av,j}$ is an average at the jth location, and $S_u$ is a measured value obtained by a terminal having an application just installed thereon and starting measurement. Measurement may be performed at all locations where j ranges from 1 to m. However, it is not required to obtain an m number of correction factors a or b by measuring values only at locations where the values may be measured, and one of the correction factors a and b may be obtained to be used as the same value. $a_j$ and $b_j$ represent correction factors (where $a_1=a_2=a_3 \ldots a_m$).

The correction factors a and b are obtained through repeated measurements at a single location and used, and are updated every predetermined period and used. An actual coefficient of measurement is corrected by using the obtained correction factors a and b.

$$S_{out,j} = S_u\left(1 - a_j\left(1 - \frac{S_u}{S_{av,j}}\right)^{bi}\right) j = 1, 2, \ldots m,$$

where $S_{out,j}$ represents a measured value corrected by using the correction factors a and b and is used to measure the current location by being compared with the sensing pattern information stored in the sensing pattern information DB 31.

Figure 3:
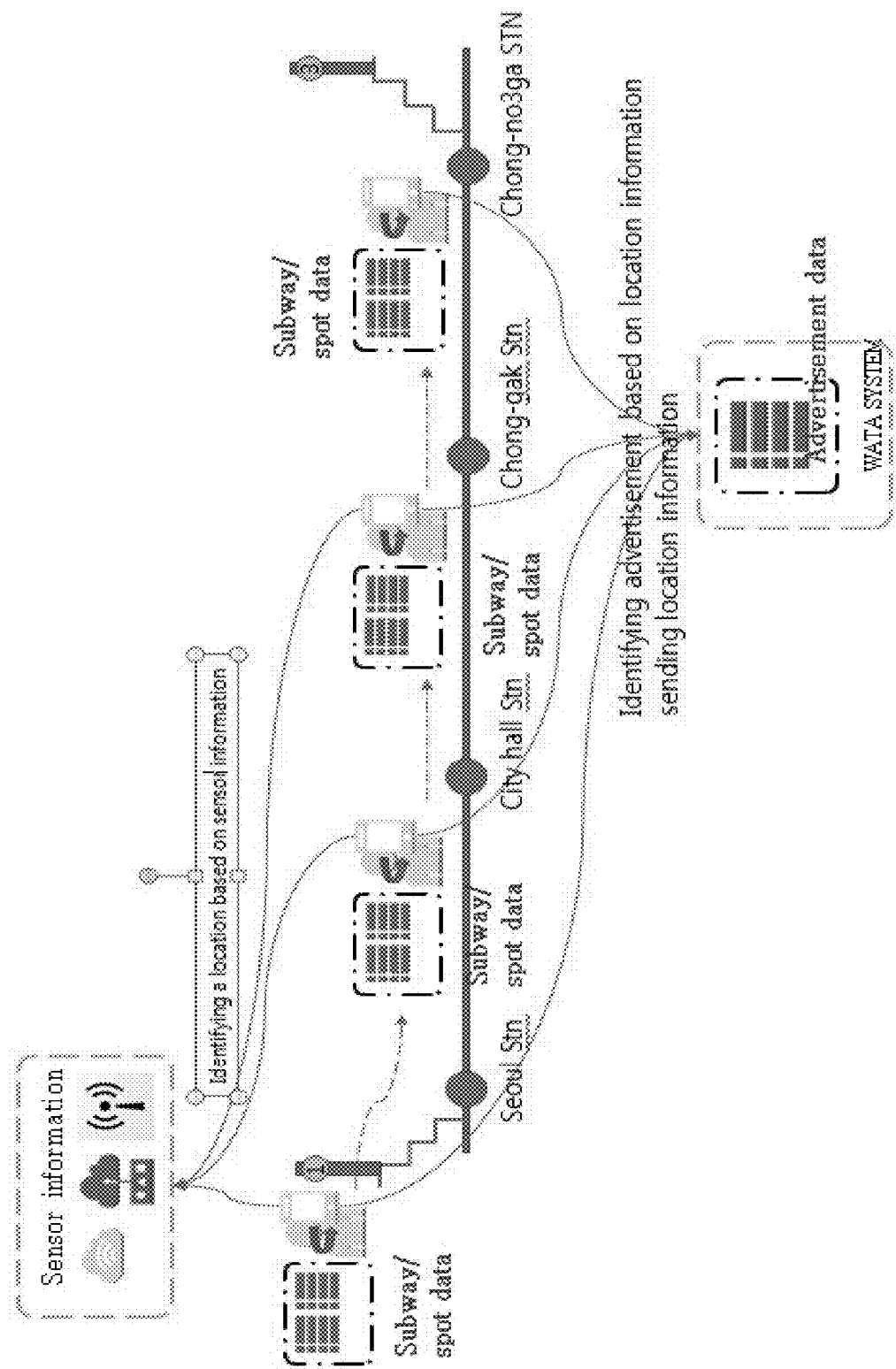

FIG. 3 illustrates an example of identifying a location based on information sensed by the providing system 11 according to an embodiment of the present disclosure and providing an advertisement on the basis of the location value.

To identify whether a user boards a subway or train, when the user passes through a specific exit of a subway or train, sensing pattern information at the specific exit is checked, and when the user stands on a platform to board a subway or train, sensing pattern information at the platform is checked, and thus it is identified which spot the user is located at. Then, when sensing pattern information at another station is checked, it may be identified that the user passes through the other station after boarding a subway at a specific station, and when sensing pattern information at an exit of another station is checked, it may be identified that the user gets off the subway at the other station.

For this end, a path generating module 22 stores, in a subway line map DB 32, pieces of sensing information sensed by the user terminal, and identifies a path along which the user moves from sensing information obtained by sensing the path. For example, the path generating module 22 generates a path for identifying that the user enters a subway station through any exit thereof and moves via any station through any platform.

A boarding identifying module 23 identifies that the user moves by subway and provides guidance information about a next station to the user. The boarding identifying module 23 identifies the user's path to check that the user boards a subway, identifies whether the user boards a subway by using a beacon or other means provided within a passenger car, and then proceeds with a stop station guidance mode.

Alternatively, the boarding identifying module 23 identifies whether the user is within a station or moves by subway through information sensed when the user turns off an application or the user terminal when entering a subway station through an exit and then turns on the application or the user terminal within the subway station, or when the user boards a subway and then turns on the application or the user terminal. The boarding identifying module 23 may identify that the user boards the subway when only a barometer signal is sensed while a spot corresponding to a platform is sensed and an AP value (Wi-Fi intensity) or a Bluetooth signal is not detected and may determine that the user boards the subway in a case where an AP signal or the like is detected when the subway pulls into a station.

Even when a place is not designated as a spot but located a little away from the spot (for example, located at a location between a platform and any exit), if sensing information at the spot includes an average and a standard deviation of measured values measured by the respective sensors, the boarding identifying module 23 may predict to which spot the user is close from a normal distribution table, and may identify whether the user is at least within a station or boards a subway.

When a station where the user boards a subway is identified, which boarding gate the user uses is identified, and then the user's boarding is identified, it is possible to previously provide guidance information about a station in a direction where the user heads through the subway line map DB 32. Since an average moving time at a station is also stored in the subway line map DB 32, guidance information about the next station may be provided before a predetermined time from an arrival time after the boarding.

Figure 4:

The guidance information about the next station may be directly provided to the user terminal without using broadcasting within a passenger car. Sensing information according to an embodiment of the present disclosure is collected through an application installed on the user terminal, and guidance information about a next arrival station may also be provided through the application installed on the user terminal as illustrated in FIG. 4. At a request for the use of service, the user sets an arrival station and a type of alarm, and thus the user terminal displays an alarm message at an arrival of a subway at the arrival station.

Among individuals using a subway, a ratio of some of the individuals using smartphones during boarding is large, and some individuals often keep their eyes on the screens of smartphones. Therefore, guidance information is highly efficiently provided by the smartphones. Further, when the individuals listen to music or the like using earphones, the guidance information is provided by the smartphones using audio, and thus the individuals may be prevented from missing guidance information about an arrival station.

A stop station guidance module 25 provides guidance on a stop station by identifying the current location and the location of a next station, and in the case of a transfer, provides guidance on a next station after the transfer by using sensing pattern information on a platform.

A case in which sensed information suddenly disappears and only some information is sensed indicates that the user boards a subway and starts off for a next station, and a case in which the overall amount of sensed information is reduced indicates that the user moves within a station.

Further, it may be identified whether the user changes a subway or goes out through an exit of a stop at which the user may change the subway without changing the subway (a case or the like in which the user gets off the subway at the Gangnam Station using Line No. 2, comes out to Sinbundang Line, and goes out through an exit on Sinbundang Line without changing the subway) by identifying the user's moving path and whether the user passes through the exit.

The stop station guidance module 25 enables the user to know what the current station, which the user is passing through, is by scrolling the current station down one or two lines from above on the user terminal, and when the subway arrives at an arrival station, the stop station guidance module 25 displays a large image as illustrated in FIG. 4 to scroll the current station down on the user terminal. Guidance information may be provided in various forms such as a push message and a voice message according to the user's settings.

Further, an advertisement providing module 24 may operate intermittently while the user moves by subway. The advertisement providing module 24 may receive, from an advertisement DB 35, an advertisement requested by the user terminal at a preferred location when the user terminal is located at the preferred location and may provide the advertisement to the user terminal. For example, an advertisement provided at exit 1 or on a platform may be changed, and when the interior of a station is divided in more detail, the advertisement providing module 24 may provide advertisements related to stores in front of the user along the moving path of the user. For this purpose, the user terminal may further include a predicted arrival point determining module determining a predicted arrival point by using the user's moving path or moving direction.

Further, an emergency guidance module 26 may operate in an emergency such as a fire or accident, and when the user is cut off from external sound because of wearing an earphone in an emergency incident or does not grasp whether any situation occurs because of watching the user terminal, the emergency guidance module 26 may report an occurrence of an emergency event or accident to the user terminal at a request of the providing server 11 to allow the user to rapidly react to the emergency event or accident.

As in the related art, when information about the occurrence of an emergency event or accident is provided through broadcasting within a passenger car, there may be an individual who does not listen to or watch the broadcasting if he or she is not careful. However, since the location of the user terminal according to an embodiment of the present disclosure is immediately identified, when an event or accident occurs, the user terminal at the identified location may notify the user of the occurrence of the event or accident. Therefore, the user may be evacuated from, and may react to, the event or accident. An accident occurring in a subway may lead to a major accident, and in the event of an accident, the user may have a means for immediately providing guidance information about an accident to the user one-to-one. Further, since the user always pays attention to information provided by the user terminal to receive guidance on a station, the guidance may be more efficiently provided to the user.

The user terminal may be used as a means for providing public information related to an area, as well as information about an event or accident.

Further, the user terminal may identify that the user passes through a specific exit to thus provide an advertisement matched in relation to the specific exit to the user. In a station, the user terminal may provide an advertisement regarding a product of a store within the station and may provide an advertisement matched in relation to the location of a restaurant, hospital, or bookstore near exit 1, thereby further increasing advertising efficiency. In addition, if the user terminal can receive additional information such as the sex or age of the user when the user joins a service to use an application, the user terminal may provide a differentiated advertisement to the user according to an area where the user is and to the sex and age thereof, thereby enabling more efficient advertising.

Stations are considerably away from each other; places where the location of the user terminal is identified in an embodiment of the present disclosure are a platform, a ticket barrier, and an entrance of a station, which are significantly spaced apart from each other; and information about such spots is only several in each station. Thus, even when information about all spots in Seoul is downloaded, an amount of the downloaded information is not large. Accordingly, the information may be used in most smartphones including old terminals.

Figure 5:
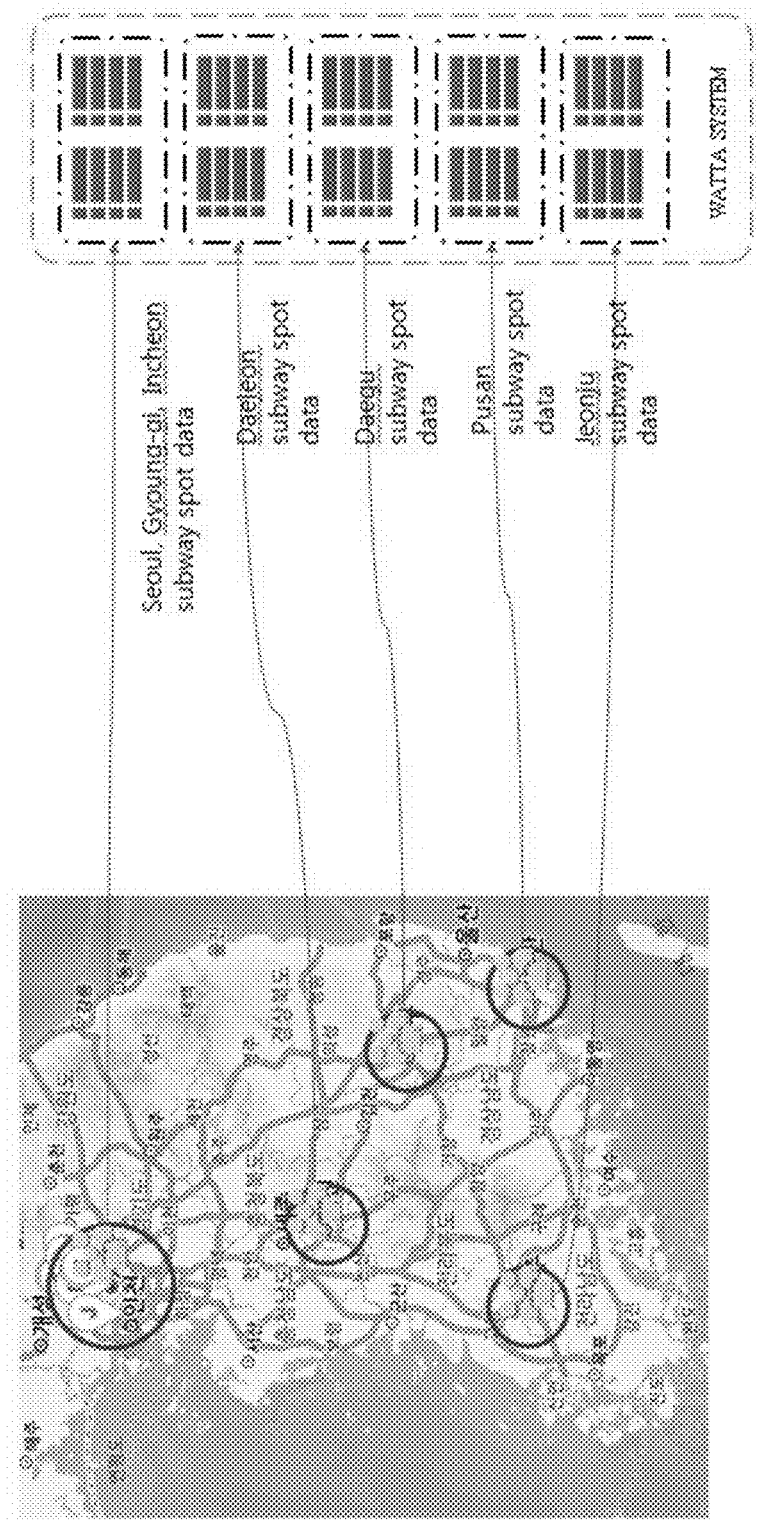

FIG. 5 illustrates an example of automatically downloading information about subways and spots even when the user enters a specific zone having subways. In the example, the user terminal may determine whether the user enters the specific zone by using a GPS.

Further, when the user waits without boarding a subway, the user terminal may provide guidance information about arrival of a subway to the user. Subways generally depart on time and arrive on time. However, when a subway arrives late due to an unexpected accident, the user terminal according to an embodiment of the present disclosure may provide guidance information about delayed arrival of the subway in this case.

Figure 6:
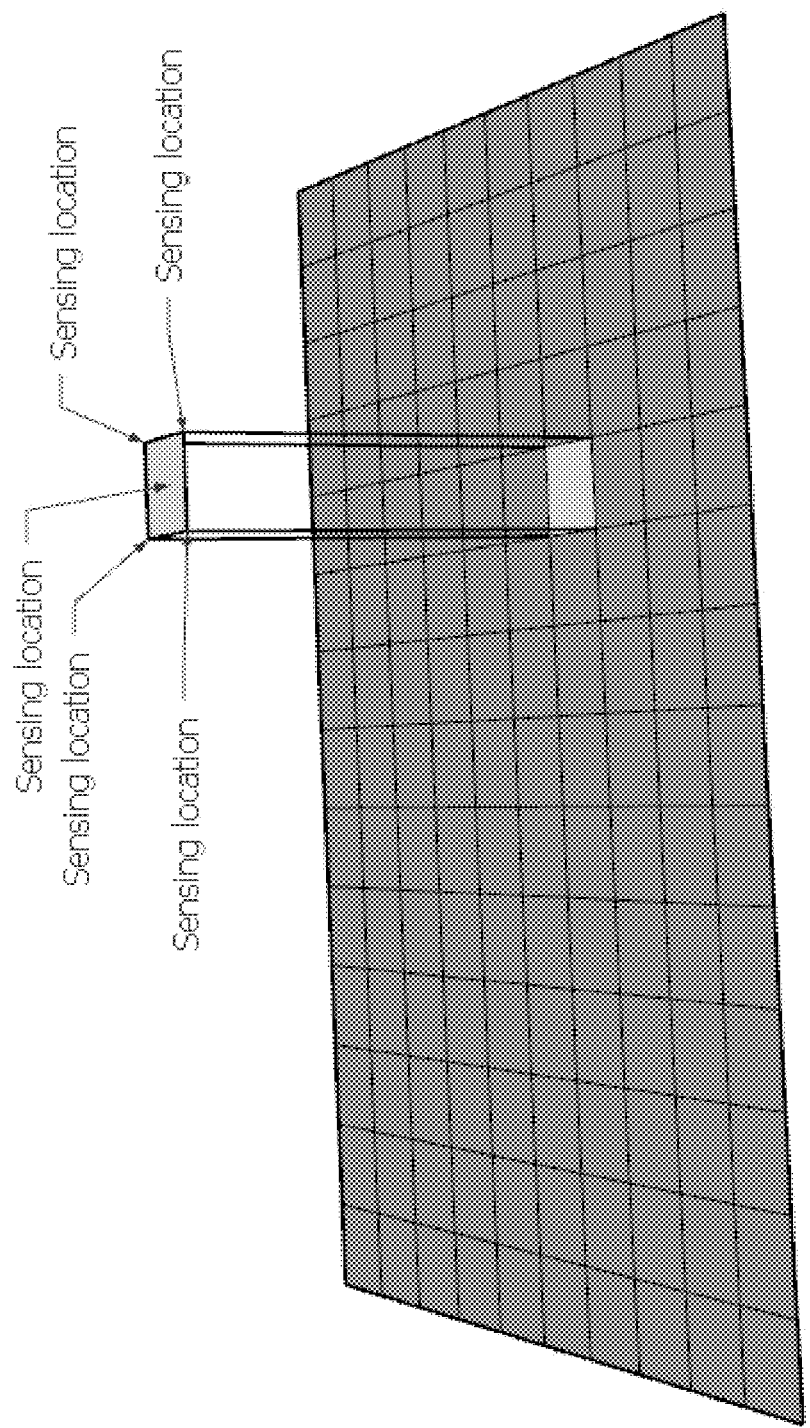
Figure 7:
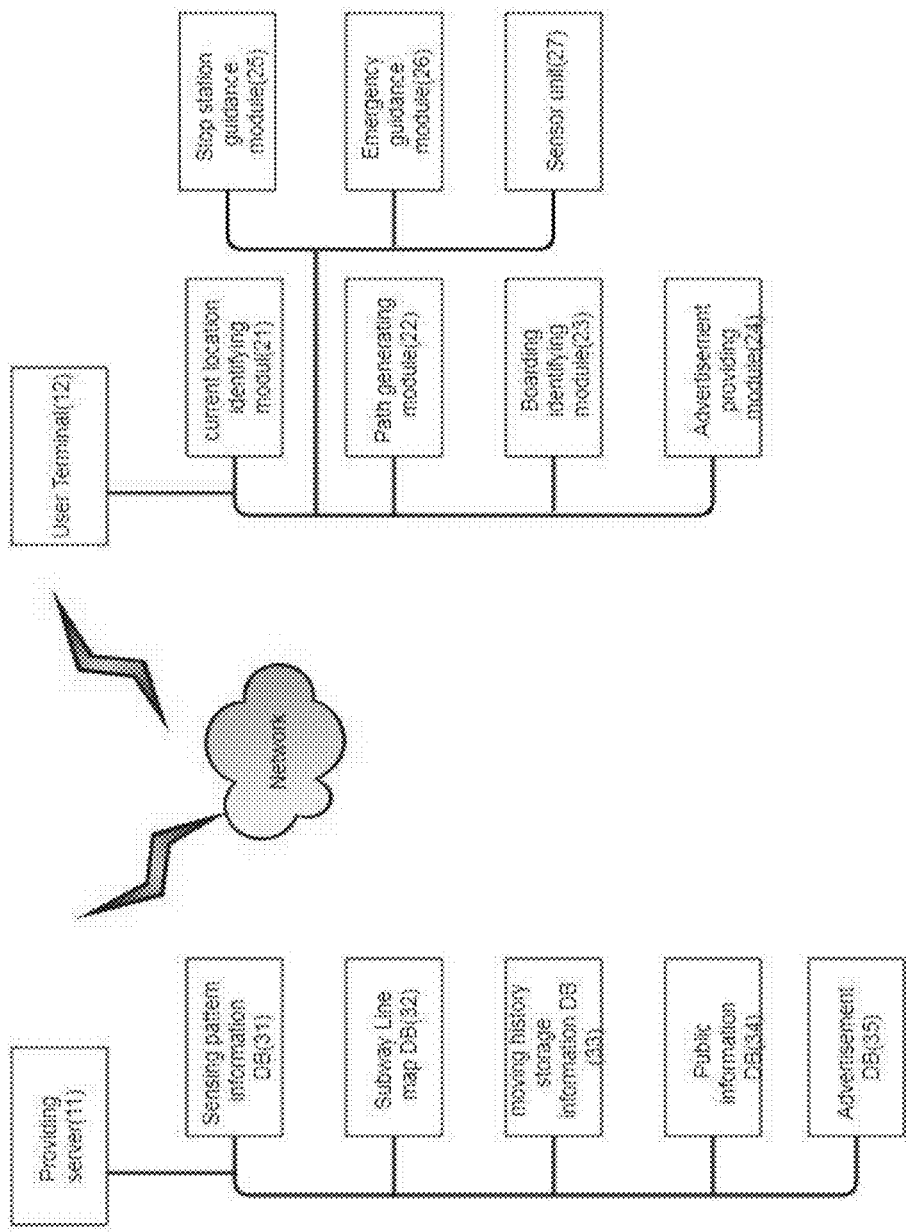

FIG. 6 illustrates another example of collecting spot information. To confirm a more accurate location within a subway station, the subway station including a platform, a ticket barrier, and a subway entrance is divided into predetermined sizes of zones, the respective zones are set as spots, and sensing pattern information is collected at the respective spots. An average and a standard deviation for each sensing information may be obtained at the respective spots and on the boundaries of the spots by measuring the intensity of each sensing information on the boundaries of the spots and inside the spots and repeating such measurement. When the zones are divided as quadrangle, five measured values, including measured values at the respective vertexes of the quadrangles or at the centers of sides between the vertexes and a measured value at the center of each of the quadrangles may be obtained, an average and a standard deviation of the respective measured values may be obtained, and the obtained average and standard deviation may be stored in the sensing pattern information DB 31. When the user is in a corresponding zone, which zone the user is in may be determined by comparing sensing pattern information obtained in the zone with four pieces of sensing pattern information obtained outside of the zone, and how far away the user is from the center of the zone may be determined by comparing the sensing pattern information obtained in the zone with pattern information obtained at the center of the zone. Even when the determined location information is not an accurate location of the user, the determined location information may be information by which whether the user is within the zone may be determined at least.

The location information accurately determined in such a manner may be efficiently used for a location-based advertising. Since most GPSs do not work inside a subway station, a location-based advertisement may not be provided. Also, since a recent station is developed together with a shopping mall, a theater, and the like, the recent station has a large floating population and a major business district, and thus, there are many large underground shopping malls in the station. When location-based advertising is activated in the station, a type of advertisement provided according to the user's location may be changed. Thus, immediately before the user reaches a specific store, the user terminal may display an advertisement related to the specific store and may provide a coupon to the user to lead to user purchase, thereby enabling efficient advertising.

The user often has difficulty in finding a way within a subway station. The user terminal able to identify a location according to an embodiment of the present disclosure may guide the user into an exit in a subway station, may display an advertisement related to a store in the subway station or to an exit of a subway station to which the user goes in addition to the guidance, and may provide a coupon to the user.

A large amount of sensing information may also be used to identify a more accurate location, and zones may be created as illustrated in FIG. 6. When a plurality of measured values is obtained in each zone, learning may be performed by using measured values at respective measurement locations as input values, using the measurement locations as output values, and using a neural network.

The measurement locations may include three of plane coordinates (x, y) and height coordinates (w), and variables, indicating the number of layers or other locations rather than a height, may be used. Since sensing pattern information is apparently the functions of the measurement locations, learning may be performed by using detectable information as input values. Since the number of input values is from 4 to 6, learning may be performed by using a relatively simple form of neural network, and the whole information about a single station may be learned by using one or two hidden layers. When using the neural network having performed learning in such a manner, the user terminal may output a current location value and identify the current location by only receiving sensing pattern information. Particularly, when using the neural network, if learning is periodically performed, a change in a sensing value according to aging of a device without additionally updating the sensing pattern information DB is reflected and learned to thus facilitate maintenance of the device. Further, the user terminal may provide more accurate location information, thereby providing guidance information about a station or providing a location-based advertisement inside or outside the station more easily.

When a plurality of measurement locations is provided at the time of learning sensing pattern information, measured values at the respective measurement locations and those at adjacent spots have a degree of correlation therebetween. In an embodiment, learning may be performed by using output values at the adjacent spots as reinput values rather than performing learning with the respective spots regarded as individual spots. In a simpler manner, a network may be used receiving, as input values, output values at a spot on the left of a spot to be learned and at a spot on the right thereof. Here, since correlation between the adjacent spots is also learned, learning efficiency may be further increased.

Figure 8:
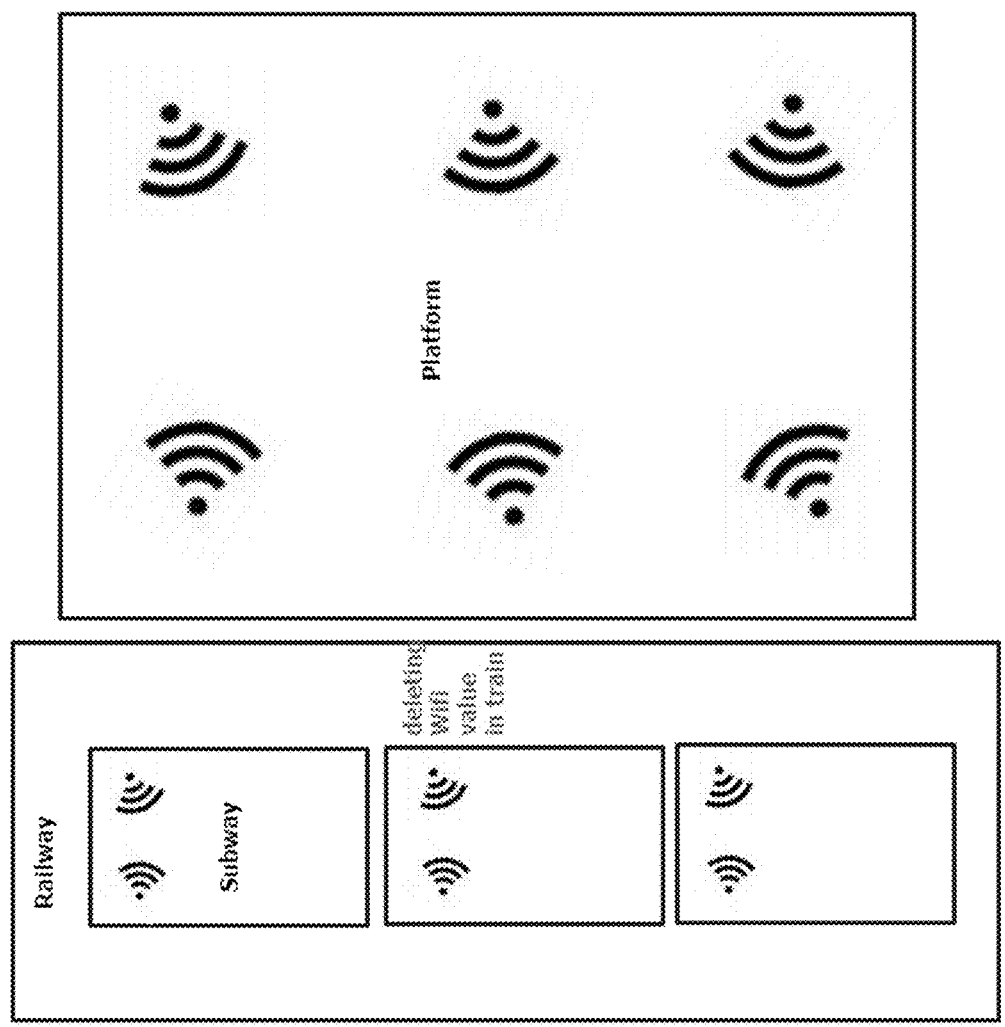

In addition, since Korea has Wi-Fi routers provided inside all the subways, the Wi-Fi intensity values are not fixed within a certain section and are changed according to subway lines. As illustrated in FIG. 8, the user terminal measures a Wi-Fi intensity signal within a subway and a Wi-Fi intensity signal on a platform. Since a Wi-Fi signal value inside the subway is influenced by movement of the subway and may be measured to have a value similar to that measured within another station, the user terminal may delete the Wi-Fi signal value inside the subway and may primarily use a Wi-Fi signal value on the platform.

Figure 9:
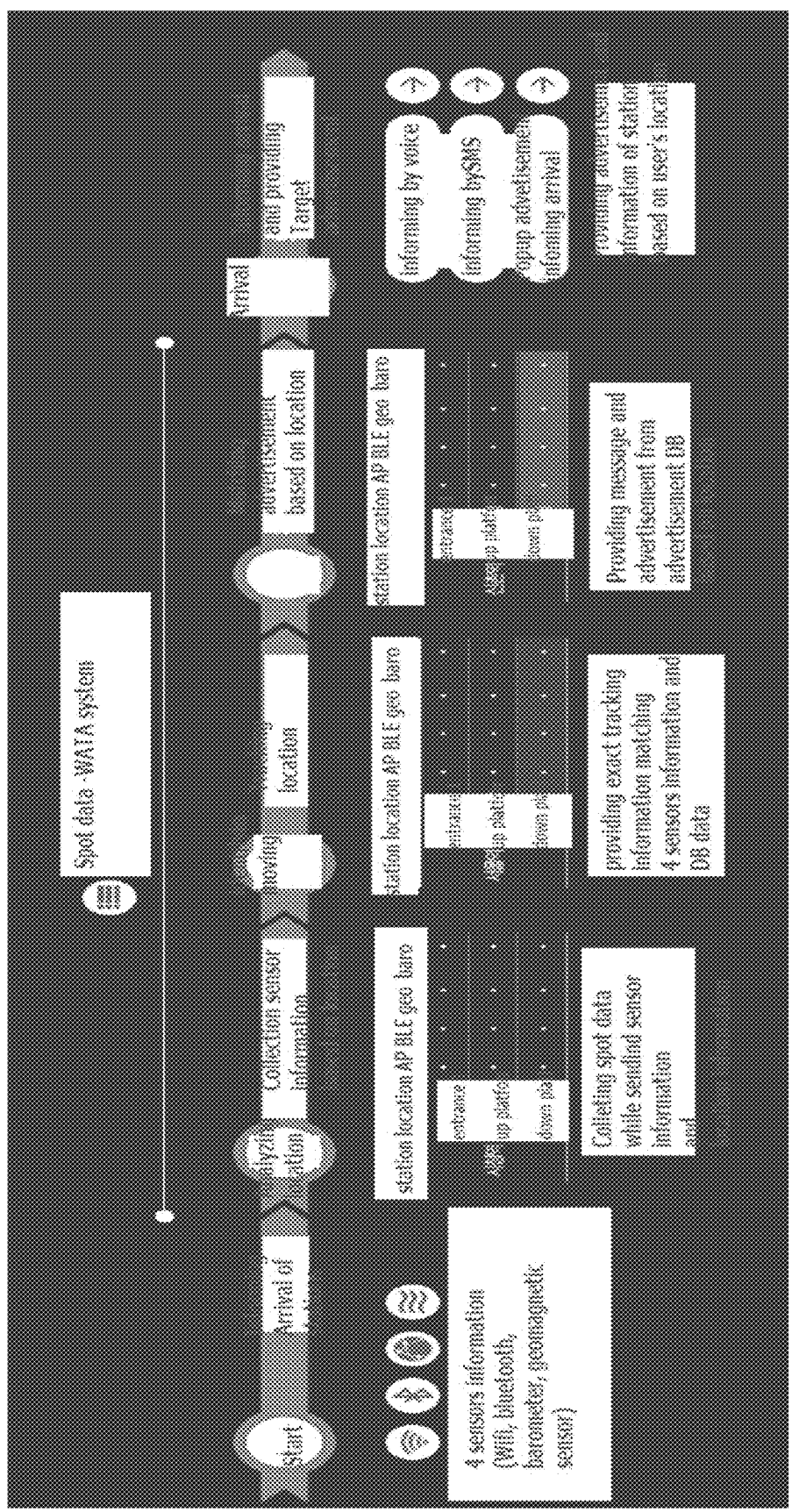
Figure 10:
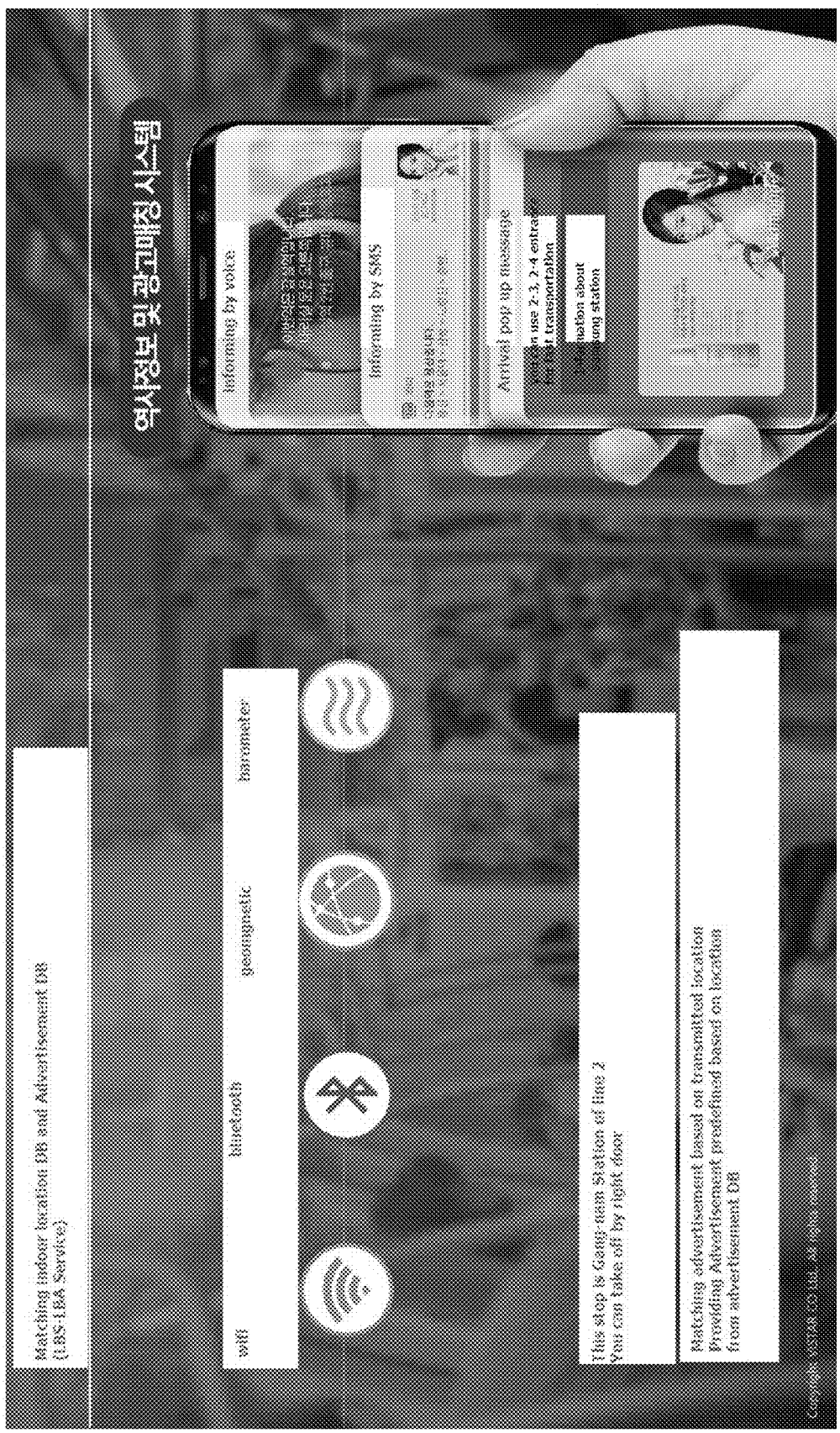

FIGS. 9 and 10 illustrate a system according to embodiments of the present disclosure more briefly. The system according to an embodiment of the present disclosure uses GPS information when the GPS information is available. For example, the system may provide a notification of arrival at a station by using GPS information when a subway passes through a section rather than a tunnel. However, the system tracks accurate location information by collecting sensing information according to locations in a place where GPS information is not available.

According to an embodiment of the present disclosure, an internal space of the station may be divided into a plurality of spots, and the system may separately transmit advertisements stored in the advertisement DB in connection with the advertisement DB at the respective spots. Thus, other advertisements may be provided on an up platform and a down platform, and other advertisements may also be provided at exit 1 and exit 3. Further, since an advertisement depends on a station, the system enables an advertisement providing contact to be made with an advertiser at each spot. Thus, the system may provide a differentiated advertisement by spot and by user, in connection with user information.

FIG. 11 illustrates an example of classifying a place using the identification value of a sensor and displaying a notification SMS message and an advertisement table provided in each place. In FIG. 11, the system classifies eight spots and provides a notification and an advertisement.

Figure 12:
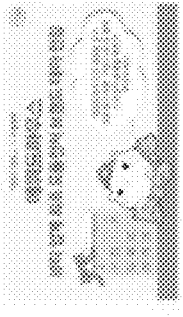

Further, the system provides accurate location-based service-location-based advertizing (LBS-LBA) according to the user's sex, age, and preference, collects, stores, classifies, and analyzes data used by a passenger, derives insight therefrom, and provides necessary LBS-LBA to the user. FIG. 12 illustrates an example of providing other advertisements according to the user's sex, age, and preference. The system enables more effective target advertising by providing other advertisements according to the number of times that the user uses a subway, a time when the user uses the subway, and a station where the user uses the subway.

As set forth above, according to the embodiments, the system for notifying of arrival at a subway station and providing station information by using integrated smartphone positioning may enable positioning without using a GPS, thereby providing guidance on an arrival station or a location-based advertisement.

While exemplary embodiments have been shown and described above, it will be apparent to those skilled in the art that modifications and variations could be made without departing from the scope of the present disclosure, as defined by the appended claims.

What is claimed is:

1. A system for providing subway guidance information, comprising:

a sensing pattern information DB storing sensing information associated with each of a plurality of spots of a subway station; and a user terminal that is configured to communicate with the sensing pattern information DB, said user terminal comprising a sensor unit having a plurality of sensors, a current location identifying module, a path generating module, a boarding identifying module and a stop station guidance module, wherein said sensor unit periodically measures one or more signals from said spots and stores the measured values in the sensing pattern information DB as the sensing information, said current location identifying module compares the signals collected by the sensor unit with the sensing information stored in the sensing pattern information DB to determine current location of the user terminal, said path generating module generates a moving path of the user terminal according to the current location periodically determined by the current location identifying module, said boarding identifying module determines whether the user terminal is on or off a subway, said stop station guidance module prompts guidance information when the boarding identifying module determines the user terminal is traveling on the subway, and wherein the guidance information includes information about remaining time until the subway arrives to the next station, alarm that signals arrival of the subway a station, alarm that signals arrival of the subway to a predefined destination station.

2. The system of claim 1, wherein said one or more signals collected from the sensor unit comprises a Wi-Fi signal, a Bluetooth signal, a geomagnetic signal, a barometer signal, a magnetic field signal, an acceleration signal and a gyro signal.

3. The system of claim 2, wherein said plurality of spots of the station comprises an up platform, a down platform, a ticket barrier and an entrance of said subway station.

4. The system of claim 3, wherein each of the spots is divided into a plurality of zones of a predetermined size, and wherein the sensing pattern information DB stores sensing information of each of the plurality of zones.

5. The system of claim 4, wherein the sensing information of each of the plurality of zones stored in said sensing pattern information DB is prepared by normalizing said one or more signals obtained by the sensing unit of the user terminal by the following formula:

$$S_{i,j} = \frac{S_{max,j} - S_{measurement,j}}{S_{max,j}},$$

where $S_{max,j}$ is a measured maximum value at a $j^{th}$ measurement location, $S_{measurement,j}$ is a measured value at the $j^{th}$ measurement location, and $S^{ij}$ is a value obtained by normalizing a measured value sensed by an $i^{th}$ sensor at the $j^{th}$ measurement location, where an average value at the $j^{th}$ measurement location is calculated by the following formula:

$$S_{av,j} = \left(\sum_{i=1}^{n} \frac{S_u}{n}\right), j = 1, 2, \ldots m,$$

where $S_{av,j}$ is an average value at the $j^{th}$ measurement location, and a measured value obtained by the user terminal is corrected by using correction factors $a_j$ and $b_j$ calculated by the following formula:

$$S_{av,j} = S_u\left(1 - a_j\left(1 - \frac{S_u}{S_{av,j}}\right)^{bi}\right) j = 1, 2, \ldots m,$$

for a certain period of time, where $S_u$ is a measured value obtained by the user terminal and $a_j$ and $b_j$ are correction factors.

6. The system of claim 2, further comprising an advertisement DB storing advertisement data designated with a preferred spot of the subway station for presentation, wherein the user terminal is configured to retrieve and present the advertisement data designated with the preferred spot that corresponds to the current location of the user terminal.

7. The system of claim 2, wherein said boarding identifying module identifies whether the user terminal is on the subway by sensing a beacon signal within a subway.

8. The system of claim 2, wherein said boarding identifying module determines the user terminal is on the subway when sensing a beacon signal within a subway.

9. The system of claim 2, wherein said boarding identifying module determines the user terminal is on the subway when one or more signals sensed from the platform is no longer sensed.

10. The system of claim 2, wherein said boarding identifying module determines the user terminal is traveling on the subway when sensing one or more signals associated with a subway station different from the subway station associated with the previously sensed signals.

* * * * *